United States Patent
Song

(10) Patent No.: US 11,822,884 B2
(45) Date of Patent: *Nov. 21, 2023

(54) UNIFIED MODEL FOR ZERO PRONOUN RECOVERY AND RESOLUTION

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,094

(22) Filed: Jul. 25, 2022

(65) Prior Publication Data

US 2022/0366136 A1 Nov. 17, 2022

Related U.S. Application Data

(63) Continuation of application No. 16/704,241, filed on Dec. 5, 2019, now Pat. No. 11,481,548.

(51) Int. Cl.
*G06F 40/253* (2020.01)
*G06F 40/284* (2020.01)
*G06F 40/30* (2020.01)

(52) U.S. Cl.
CPC .......... *G06F 40/253* (2020.01); *G06F 40/284* (2020.01); *G06F 40/30* (2020.01)

(58) Field of Classification Search
CPC ........ G06F 40/40; G06F 40/44; G06F 40/253; G06F 40/284; G06F 40/20; G06F 40/205; G06F 40/216; G06F 40/242; G06F 40/30; G06F 20/00; G06F 17/27; G06F 17/28; G06N 3/02; G06N 3/08

See application file for complete search history.

(56) References Cited

U.S. PATENT DOCUMENTS

| 10,878,808 B1 * | 12/2020 | Mathias ................. G10L 15/22 |
| 2007/0156393 A1 | 7/2007 | Todhunter et al. |
| 2008/0319735 A1 | 12/2008 | Kambhatla et al. |
| 2013/0185049 A1 | 7/2013 | Zhao et al. |
| 2020/0344194 A1 | 10/2020 | Hosseinisianaki et al. |

OTHER PUBLICATIONS

Qingyu Yin, Yu Zhang, Weinan Zhang, Ting Liu, William Yang Wang, Zero Pronoun Resolution with Attention-based Neural Network, Aug. 2018, Association for Computational Linguistics, Proceedings of the 27th International Conference on Computational Linguistics, p. 13-23 (Year: 2018).

(Continued)

*Primary Examiner* — Paras D Shah
*Assistant Examiner* — Alexander Joongie Kim
(74) *Attorney, Agent, or Firm* — Sughrue Mion, PLLC

(57) ABSTRACT

A method, computer program, and computer system to recover a dropped pronoun is provided for receiving data corresponding to one or more input words and determining contextual representations for the received input word data. The dropped pronoun may be identified based on a probability value associated with the contextual representations, and a span associated with one or more of the received input words may and that corresponds to which of the input words the dropped pronoun refers may be determined.

20 Claims, 6 Drawing Sheets

(56) References Cited

OTHER PUBLICATIONS

Longyue Wang, Zhaopeng Tu, Xing Wang, Shuming Shi, One Model to Learn Both: Zero Pronoun Prediction and Translation, Sep. 2019, (Year: 2019).

Chen Chen, Vincent Ng, Chinese Zero Pronoun Resolution with Deep Neural Networks, Aug. 2016, Association for Computational Linguistics, Proceedings of the 54th Annual Meeting of the Association for Computational Linguistics (vol. 1: Long Papers), p. 778-788 (Year: 2016).

Xin Tan, Shaohui Kuang, Deyi Xiong, Detecting and Translating Dropped Pronouns in Neural Machine Translation, Sep. 2019, Springer Nature Switzerland, Natural Language Processing and Chinese Computing 8th CCF International Conference, p. 343-354 (Year: 2019).

Jacob Devlin, Ming-Wei Chang, Kenton Lee, Kristina Toutanova, BERT: Pre-training of Deep Bidirectional Transformers for Language Understanding, 2019, 2019 Conference of the North American Chapter of the Association for Computational Linguistics: Human Language Technologies, vol. 1, p. 4171-4186 (Year: 2019).

International Search Report dated Nov. 30, 2020 from the International Searching Authority in International Application No. PCT/US2020/049308.

Written Opinion dated Nov. 30, 2020 from the International Searching Authority in International Application No. PCT/US2020/049308.

\* cited by examiner

UNIFIED MODEL FOR ZERO PRONOUN RECOVERY AND RESOLUTION

CROSS-REFERENCE TO RELATED APPLICATION

This is a continuation of U.S. patent application Ser. No. 16/704,241, filed Dec. 5, 2019, in the United States Patent & Trademark Office, the disclosure of which is incorporated herein by reference in its entirety.

BACKGROUND

This disclosure relates generally to field of computing, and more particularly to natural language processing.

Many languages throughout the world drop subject pronouns from sentences. While dropping subject pronouns is rare in non-pronoun dropping (non-pro-drop) languages such as English, pronoun dropping (pro-drop) occurs frequently in other languages such as Chinese, where up to 30% of subject pronouns may be dropped. For these languages, the dropped, or zero, pronoun may correspond to a sentence subject that may easily be deduced from context. In these cases, the subject may be dropped for simplicity and efficiency without introducing ambiguity for human listeners.

SUMMARY

Embodiments relate to a method, system, and computer readable medium for recovering dropped pronouns. According to one aspect, a method for recovering dropped pronouns is provided. The method may include receiving, by a computer, data corresponding to one or more input words and determining contextual representations for the received input word data. The computer may identify the dropped pronoun based on a probability value associated with the contextual representations and may determine a span associated with one or more of the received input words corresponding to which of the input words the dropped pronoun refers.

According to another aspect, a computer system for recovering dropped pronouns is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving, by a computer, data corresponding to one or more input words and determining contextual representations for the received input word data. The computer may identify the dropped pronoun based on a probability value associated with the contextual representations and may determine a span associated with one or more of the received input words corresponding to which of the input words the dropped pronoun refers.

According to yet another aspect, a computer readable medium for recovering dropped pronouns is provided. The computer readable medium may include one or more computer-readable storage devices and program instructions stored on at least one of the one or more tangible storage devices, the program instructions executable by a processor. The program instructions are executable by a processor for performing a method that may accordingly include receiving, by a computer, data corresponding to one or more input words and determining contextual representations for the received input word data. The computer may identify the dropped pronoun based on a probability value associated with the contextual representations and may determine a span associated with one or more of the received input words corresponding to which of the input words the dropped pronoun refers.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating one skilled in the art in understanding this disclosure in conjunction with the detailed description. In the drawings.

DETAILED DESCRIPTION

Figure 1:
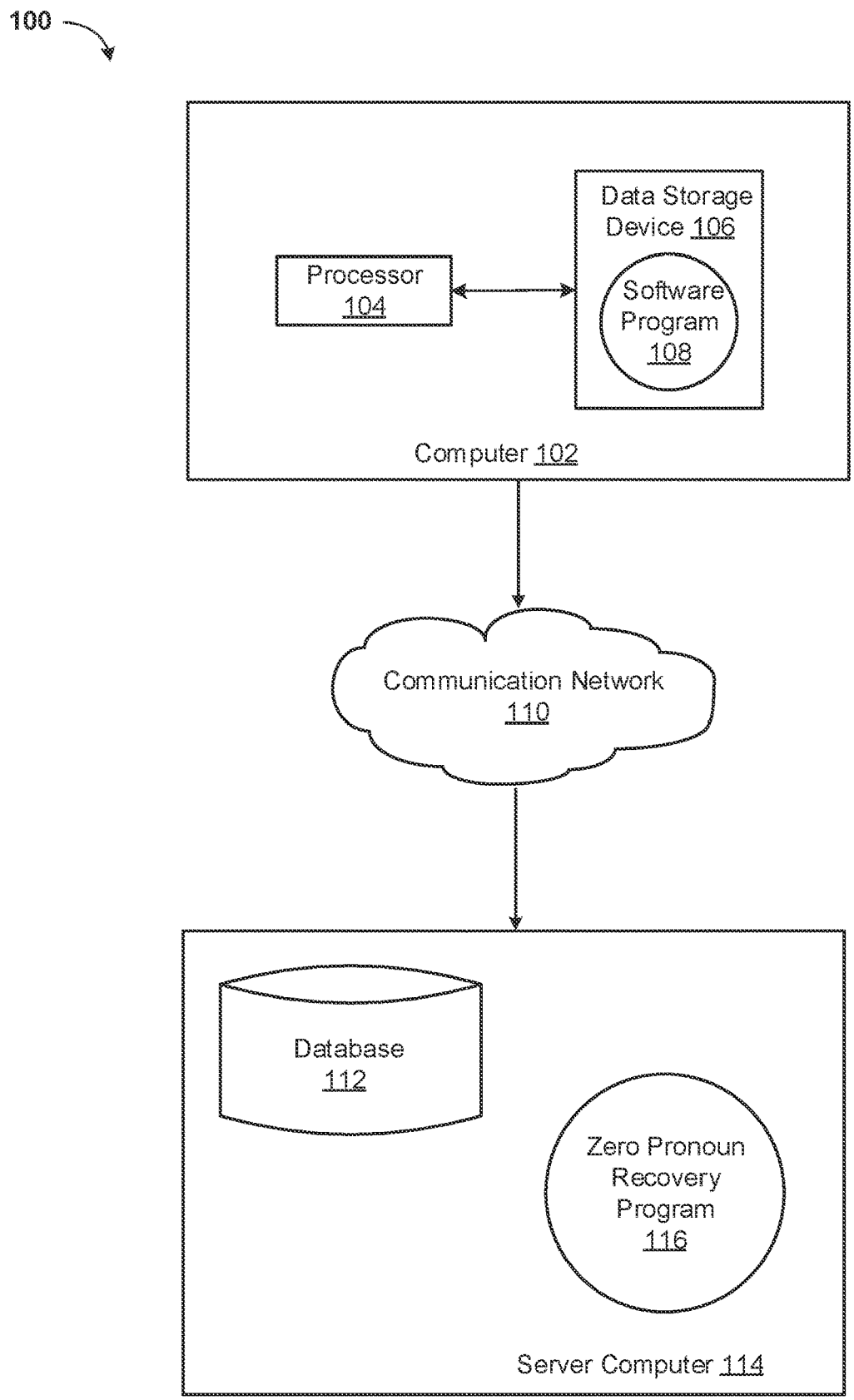
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Aspects of this disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

Embodiments relate generally to the field of computing, and more particularly to natural language processing. The following described exemplary embodiments provide a system, method and program product to, among other things, predict whether a pronoun was dropped from a sentence and recover the dropped pronoun based on context in the sentence. Therefore, some embodiments have the capacity to improve the field of computing by allowing for computers to recover dropped pronouns and determine the predicates associated with the dropped subject pronouns. Thus, the computer-implemented method, computer system, and computer readable medium disclosed herein may, among other things, be used to improve natural language processing applications for users who speak a pronoun-dropping language.

As previously described, many languages throughout the world drop subject pronouns. While dropping subject pronouns is rare in non-pronoun dropping (non-pro-drop) languages such as English, pronoun dropping (pro-drop) occurs frequently in other languages such as Chinese, where up to 30% of subject pronouns can be dropped. For these languages, the dropped, or zero, pronoun may correspond to a sentence subject that may easily be deduced from context. In these cases, the subject may be dropped for simplicity and efficiency without introducing ambiguity for human listeners. However, pronoun dropping may cause issues for computers utilizing natural language processing (NLP) as they may be unable to determine the dropped subject pronouns. Zero pronoun dropping may cause a loss of information, such as the subject or the object of the central predicate in a sentence, which may introduce ambiguity to many NLP applications, such as machine translation, question-answering based on multi-turn conversation, and dialogue understanding.

There are two long-existing tasks for zero pronouns: zero pronoun recovery, which may be used to recover the original pronoun, and zero pronoun resolution, which may be used to determine the words in the sentence to which each dropped pronoun may refer. Because the results of the two tasks highly interact with each other, it may be advantageous, therefore, to solve both tasks together. The present method, computer system, and computer-readable medium may jointly solve both tasks under a multi-task learning framework. For example, a Bidirectional Encoder Representation from Transformers (BERT) model may be used. The model may be trained in a heterogeneous way on multiple mixed datasets before the model may be updated, based on the task-specific loss value of a batch at each training step.

Aspects are described herein with reference to flowchart illustrations and/or block diagrams of methods, apparatus (systems), and computer readable media according to certain embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and program product that detects and recovers dropped pronouns. According to the present embodiment, this detection and classification may be provided through contextual analysis of received input words and a calculation of probabilities associated with the detection, recovery, and resolution of dropped pronouns.

Referring now to FIG. 1, a functional block diagram of a networked computer environment illustrating a zero pronoun recovery system 100 (hereinafter "system") for improved detecting, recovery, and resolution of dropped pronouns is shown. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 6 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 4 and 5. The server computer 114 may also be located in a cloud computing deployment model, such as a private cloud, community cloud, public cloud, or hybrid cloud.

The server computer 114, which may be used for detecting, recovering, and resolving dropped pronouns is enabled to run an Zero Pronoun Recovery Program 116 (hereinafter "program") that may interact with a database 112. The Zero Pronoun Recovery Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger zero pronoun recovery program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
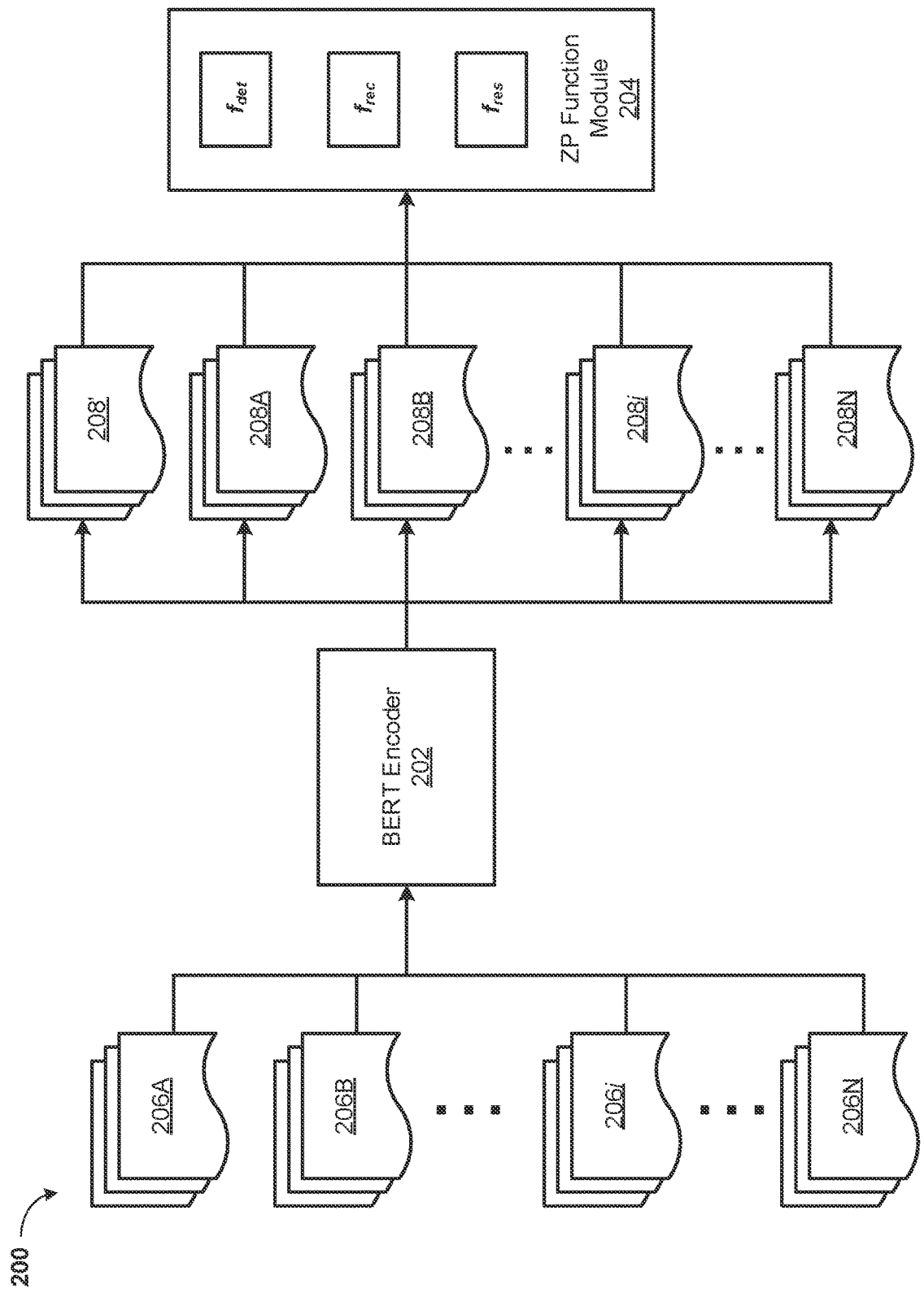
FIG. 2 is a block diagram of a program that detects and recovers dropped pronouns, according to at least one embodiment.

Referring to FIG. 2, a block diagram of a Zero Pronoun Recovery Program 116 is depicted. FIG. 2 may be described with the aid of the exemplary embodiments depicted in FIG. 1. According to one or more embodiments, the Zero Pronoun Recovery Program 116 may be located on the computer 102 (FIG. 1) or on the server computer 114 (FIG. 1). The Zero Pronoun Recovery Program 116 may accordingly include, among other things, a Bidirectional Encoder Representation from Transformers (BERT) Encoder 202 and a Zero Pronoun (ZP) Function Module 204. The BERT Encoder 202 may receive one or more input words 206A-206N and may append a [CLS] class token to the input words 206A-206N. The BERT encoder 202 may output contextual representations 208A-208N that may correspond to each of the input words 206A-206N. The BERT Encoder 202 may also output a contextual representation 208' that may correspond to a contextual representation for the [CLS] token. The ZP Function Module 204 may receive the contextual representations 208' and 208A-208N as inputs to perform one or more functions.

The task of zero pronoun recovery may be to restore any dropped pronouns for an input text. Since pronouns are enumerable, the Zero Pronoun Recovery Program 116 may cast this task into a classification problem for each word space. The ZP Function Module 204 may be configured to perform a zero pronoun recovery function $f_{rec}$ using the contextual representations 208A-208N output by the BERT encoder 202. The probability for recovering a pronoun $rec_i$ at a space between input word 206($i-1$) and input word 206$i$ may be p($rec_i$|X, i)=softmax($W_{rec}[h_{i-1}, h_i]+b_{rec}$), where $W_{rec}$ and $b_{rec}$ may be parameters for a linear classifier and h may correspond to the contextual representations 208' and 208A-208N.

The Zero Pronoun Recovery Program 116 may perform a zero pronoun resolution function $f_{res}$ by predicting a span associated with each dropped pronoun. According to one embodiment, zero pronoun recovery may be performed first and the information may be utilized in zero pronoun resolution. According to an alternative embodiment, a span of "(0,0)" may be assigned for non-zero-pronoun positions (i.e., a position having an input word). This may minimize conflicts because the position "0" may correspond to the [CLS] token, such that no real spans can be "(0,0)." The Zero Pronoun Recovery Program 116 may cast the zero pronoun resolution task for each word space between input word 206($i-1$) and input word 206$i$ as a machine reading-comprehension problem, where the resolution span may correspond to a target answer. Start and end positions may be separately determined for each span based on concatenation of all word states and self-attention modules for predicting the start and end positions of each zero pronoun resolution span. Thus, the ZP Function Module 204 may be configured to perform a zero pronoun resolution function $f_{res}$. The probability of predicting the whole span $res_i$ may be p($res_i$|X, i)=SelfAttn$_{st}$(H, i)SelfAttn$_{ed}$(H, i)=p($res_i^{st}$|X, i)p($res_i^{ed}$|X, i), where H may be the concatenation of the contextual representations 208' and 208A-208N and SelfAttn$_{st}$ and SelfAttn$_{ed}$ may be the self-attention modules for the start and end positions, respectively.

To improve the robustness of heterogeneous training, zero pronoun detection may be utilized as both a sub-task for zero pronoun detection and zero pronoun recovery, as well as an additional training value. Because zero pronoun detection may be a binary task that determined whether each word space has a zero pronoun, zero pronoun recovery may be available across multiple types of datasets. As an auxiliary task, the Zero Pronoun Recovery Program 116 may detect dropped pronouns for improved training. Since determining whether a sentence may have a dropped pronoun may be a binary classification, the ZP Function Module 204 may be configured to perform a zero pronoun detection function $f_{det}$. The probability of detecting a dropped pronoun may be p($det_i$|X, i)=softmax($W_{det}[h_{i-1}, h_i]+b_{det}$), where $W_{det}$ and $b_{det}$ may be model parameters and h may correspond to the contextual representations 208' and 208A-208N.

The ZP Function Module 204 may be trained using combined and shuffled data of both zero pronoun recovery and zero pronoun resolution tasks in order to leverage more supervision values. For example, each data instance may only contain an annotation of either zero pronoun recovery or zero pronoun resolution. Thus, a loss value for one example may be defined as loss=$-\Sigma_{i \in 1 \ldots N} \alpha$ log p($rec_i$|X, i)$-\beta$ log p($res_i$|X, i)$-\gamma$ log p($det_i$|X, i), where $\alpha$, $\beta$ and $\gamma$ may serve as a coefficient and indicator for each task. For $\alpha$ and $\beta$, the value may be "1" if a corresponding supervision value exists; otherwise it may be "0." Because a supervision value associated with zero pronoun detection may exist for all instances, the value of $\gamma$ may be set to a low value in order to avoid skewing the loss function.

Figure 3:
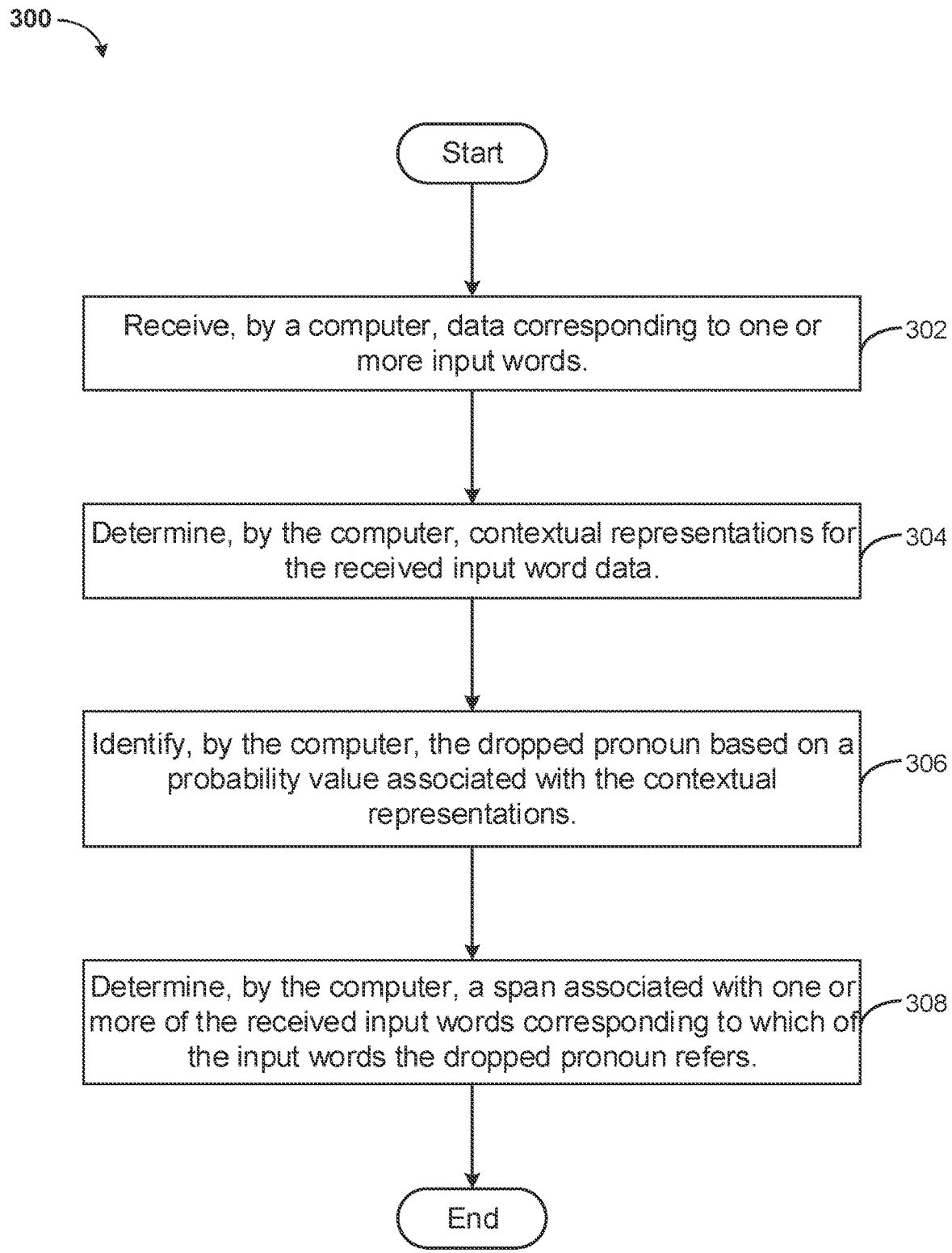
FIG. 3 is an operational flowchart illustrating the steps carried out by a program that detects and recovers dropped pronouns, according to at least one embodiment.

Referring now to FIG. 3, an operational flowchart 300 illustrating the steps carried out by a program that recovers dropped pronouns is depicted. FIG. 3 may be described with the aid of FIGS. 1 and 2. As previously described, the Zero Pronoun Recovery Program 116 (FIG. 1) may quickly and effectively detect and recover dropped pronouns.

At 302, data corresponding to one or more input words is received by a computer. The input words may be, for example, a sentence in substantially any language. The sentence may have, among other things, a dropped subject pronoun. In operation, the Zero Pronoun Recovery Program 116 (FIG. 1) may be stored on the computer 102 (FIG. 1) or the server computer 114 (FIG. 1). According to one embodiment, the Zero Pronoun Recovery Program 116 may retrieve the input words 206A-206N (FIG. 2) from the database 112 (FIG. 1) on the server computer 114. According to an alternative embodiment, the input words 206A-206N may be stored on the data storage device 106 (FIG. 1) on the computer 102 and the Zero Pronoun Recovery Program 116 may receive the input words 206A-206N from the computer 102 over the communication network 110 (FIG. 1).

At 304, contextual representations are determined for the received input word data by the computer. The contextual representations may be determined by a Bidirectional Encoder Representation from Transformers (BERT) model. The contextual representations may be used to determine how the one or more input words are used in the context of their corresponding sentence. In operation, the BERT Encoder 202 (FIG. 2) may receive the input words 206A-206N as input and may output contextual representations 208A-208N (FIG. 2) that may correspond to the input words 206A-206N. The BERT encoder 202 may append a [CLS] class token to the start of the input words 206A-206N and may output a contextual representation 208' corresponding to the [CLS] token.

At 306, the dropped pronoun is identified by the computer, based on a probability value associated with the contextual representations. Because pronouns are enumerable and there are a limited number of possible pronouns and corresponding types, the recovery of dropped pronouns may be cast into a classification problem for each word space. Thus, the computer may be able to determine, based on the context, which pronoun was dropped from the sentence. In operation, the ZP Function Module 204 (FIG. 2) may perform the zero pronoun recovery function $f_{rec}$ on the contextual representations 208' and 208A-208N (FIG. 2). The ZP Function Module 204 may determine, based on probability $p(rec_i|X, i)$ which pronoun was dropped from the sentence containing the input words 206A-206N (FIG. 2).

At 308, a span associated with one or more of the received input words is determined by the computer. The span may correspond to one or more of the input words to which the dropped pronoun refers. By determining which words make up the predicate corresponding to the dropped subject pronoun, the determination of the recovered subject pronoun may be improved. In operation, the ZP Function Module 204 (FIG. 2) may perform the zero pronoun resolution function $f_{res}$ on the contextual representations 208' and 208A-208N (FIG. 2) in order to predict the span of the predicate to which the dropped pronoun refers. The ZP Function Module 204 may determine the span, based on probability $p(res_i|X, i)$.

It may be appreciated that FIG. 3 provides only an illustration of one implementation and does not imply any limitations with regard to how different embodiments may be implemented. Many modifications to the depicted environments may be made based on design and implementation requirements.

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
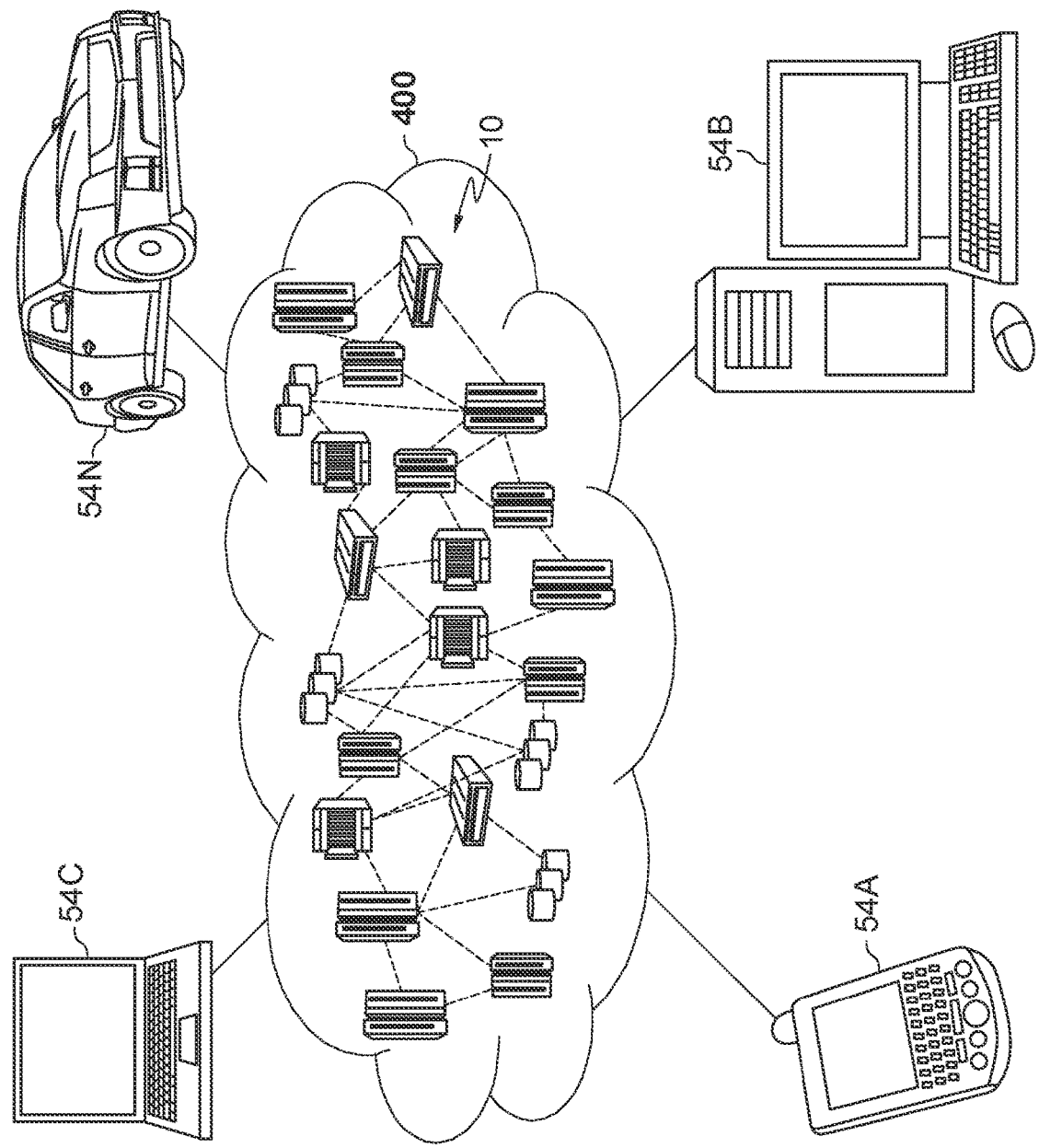
FIG. 4 is a block diagram of an illustrative cloud computing environment including the computer system depicted in FIG. 1, according to at least one embodiment.

Referring to FIG. 4, illustrative cloud computing environment 400 is depicted. As shown, cloud computing environment 400 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 400 can communicate with any type of computerized device over any type of network and/or network addressable connection (e.g., using a web browser).

Figure 5:
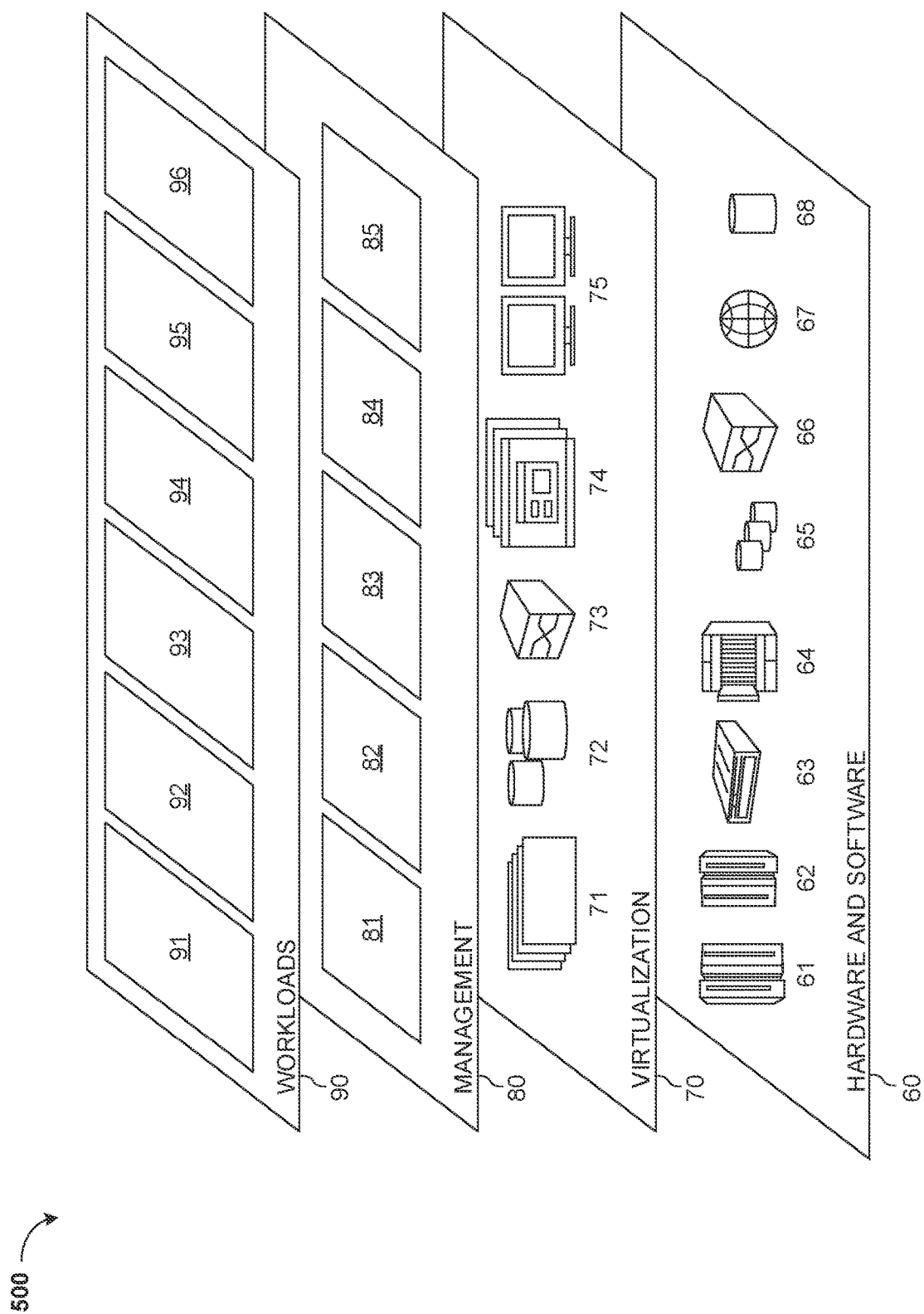
FIG. 5 is a block diagram of functional layers of the illustrative cloud computing environment of FIG. 4, according to at least one embodiment.

Referring to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Zero Pronoun Recovery 96. Zero Pronoun Recovery 96 may detect recover dropped pronouns for sentences written in languages that may allow the use of zero pronouns.

Figure 6:
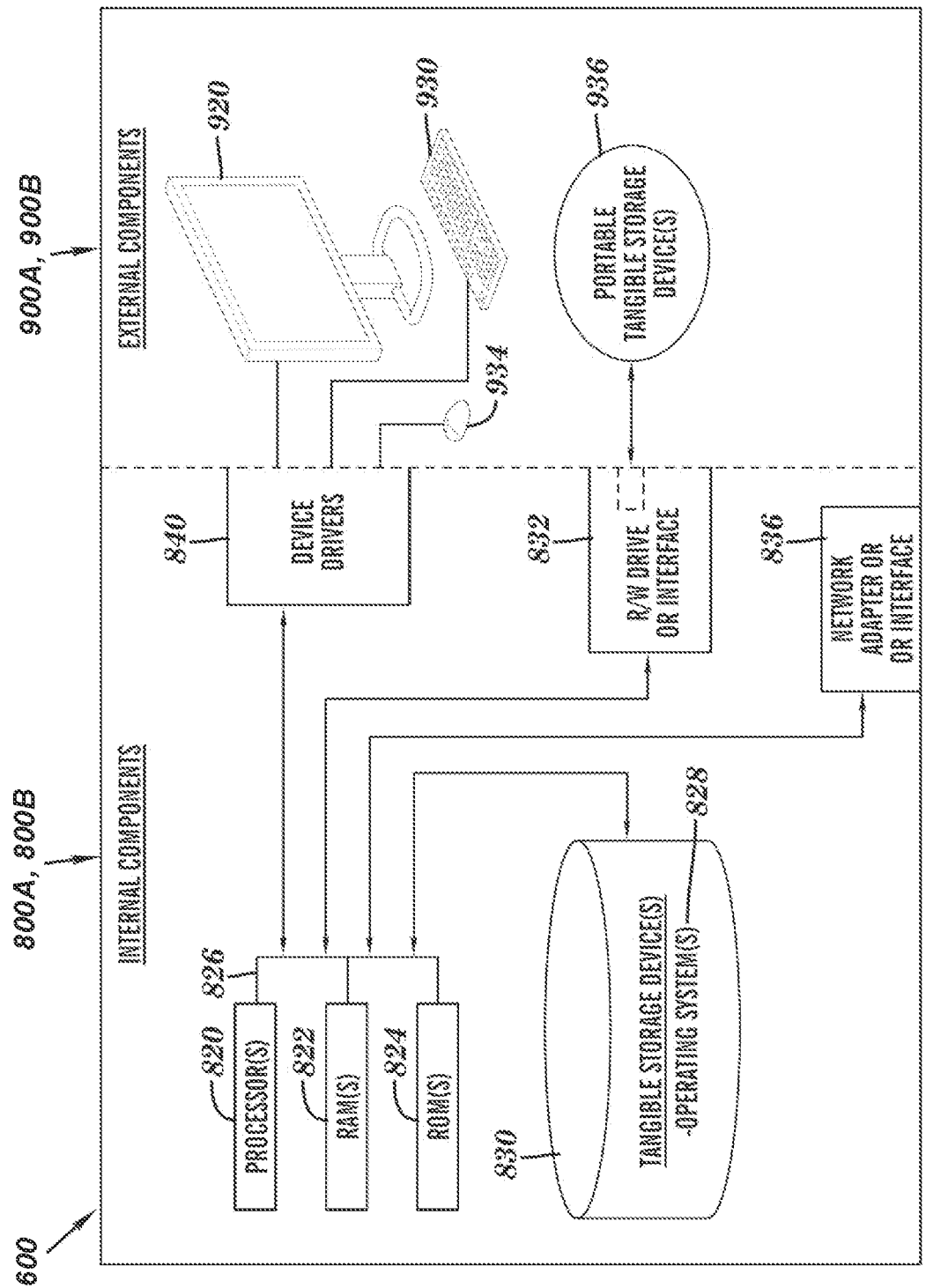
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment. It should be appreciated that FIG. 6 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Zero Pronoun Recovery Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Zero Pronoun Recovery Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Zero Pronoun Recovery Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Zero Pronoun Recovery Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computer, data indicating words;
   determining, by the computer, contextual representations, for the words indicated by the data, by a Bidirectional Encoder Representation from Transformers (BERT) encoder; and
   identifying, by the computer, a dropped pronoun based on a probability value associated with the contextual representations and determined by softmax($W_{rec}[h_{i-1}, h_i]+b_{rec}$), wherein i−1 corresponds to a first word, i corresponds to a second word, h corresponds to the contextual representations, and $W_{rec}$ and $b_{rec}$ correspond to parameters for a linear classifier.

2. The method of claim 1, further comprising detecting, by the computer, that the dropped pronoun was dropped.

3. The method of claim 2, wherein the dropped pronoun is detected using a binary classification based on a second probability value associated with the contextual representations.

4. The method of claim 2, further comprising calculating a loss value based on the detecting of the dropped pronoun, the identifying of the dropped pronoun, and the determining of a span.

5. The method of claim 1, further comprising appending, by the computer, a class token to the data, wherein the appended class token corresponds to a start position associated with the words.

6. The method of claim 5, wherein a span of zero is assigned to the appended class token.

7. The method of claim 1, further comprising:
   determining, by the computer, that the data corresponds to the dropped pronoun; and
   determining, by the computer, a type associated with the dropped pronoun.

8. The method of claim 1, wherein the probability value is a probability of recovering the dropped pronoun at a space between the first input word and the second input word.

9. The method of claim 1, further comprising:
   determining, by the computer, a span associated with one or more of the words corresponding to which of the words the dropped pronoun refers,
   wherein a start and an end position for the span is determined based on a concatenation of the words and on a self-attention module for predicting the start position and the end position of the span.

10. The method of claim 1, wherein the identifying the dropped pronoun based on the probability value associated with the contextual representations comprises identifying, based on the probability value, that the dropped pronoun would occur between two of the words.

11. A computer system comprising:
    one or more computer-readable non-transitory storage media configured to store computer program code; and
    one or more computer processors configured to access said computer program code and operate as instructed by said computer program code, said computer program code including:
    receiving code configured to cause the one or more computer processors to receive data indicating words;
    determining code configured to cause the one or more computer processors to determine contextual representations, for the words indicated by the data, by a Bidirectional Encoder Representation from Transformers (BERT) encoder; and
    identifying code configured to cause the one or more computer processors to identify a dropped pronoun based on a probability value associated with the contextual representations and determined by softmax($W_{rec}[h_{i-1}, h_i]+b_{rec}$), wherein i−1 corresponds to a first input word, i corresponds to a second input word, h corresponds to the contextual representations, and $W_{rec}$ and $b_{rec}$ correspond to parameters for a linear classifier.

12. The system of claim 11, further comprising detecting code configured to cause the one or more computer processors to detect that the dropped pronoun was dropped.

13. The system of claim 12, wherein the dropped pronoun is detected using a binary classification based on a second probability value associated with the contextual representations.

14. The system of claim 12, further comprising calculating code configured to cause the one or more computer processors to calculate a loss value based on the detecting of the dropped pronoun, the identifying of the dropped pronoun, and the determining of a span.

15. The system of claim 11, further comprising appending code configured to cause the one or more computer processors to append a class token to the data, wherein the appended class token corresponds to a start position associated with the words.

16. The system of claim 11, further comprising:
determining code configured to cause the one or more computer processors to determine that the data corresponds to the dropped pronoun; and
determining code configured to cause the one or more computer processors to determine a type associated with the dropped pronoun.

17. The system of claim 11, wherein the probability value is a probability of recovering the dropped pronoun at a space between the first input word and the second input word.

18. The system of claim 11, further comprising:
determining code configured to cause the one or more computer processors to determine a span associated with the one or more of the words corresponding to which of the words the dropped pronoun refers,
wherein a start and an end position for the span is determined based on a concatenation of the words and on a self-attention module for predicting the start position and the end position of the span.

19. The system of claim 11, wherein the identifying code is configured to cause the one or more computer processors to identify, based on the probability value, that the dropped pronoun would occur between two of the words.

20. A non-transitory computer readable medium having stored thereon a computer program configured to cause one or more computer processors to:
receive data indicating words;
determine contextual representations, for the one or more words indicated by the data, by a Bidirectional Encoder Representation from Transformers (BERT) encoder;
identify a dropped pronoun based on a probability value associated with the contextual representations and determined by $\text{softmax}(W_{rec}[h_{i-1}, h_i] + b_{rec})$, wherein i−1 corresponds to a first input word, i corresponds to a second input word, h corresponds to the contextual representations, and $W_{rec}$ and $b_{rec}$ correspond to parameters for a linear classifier.

* * * * *